US011409512B2

(12) United States Patent
Paralikar

(10) Patent No.: US 11,409,512 B2
(45) Date of Patent: Aug. 9, 2022

(54) SYSTEMS AND METHODS FOR MACHINE LEARNING BASED EQUIPMENT MAINTENANCE SCHEDULING

(71) Applicant: Citrix Systems, Inc., Fort Lauderdale, FL (US)

(72) Inventor: Hrushikesh Shrinivas Paralikar, Milpitas, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 285 days.

(21) Appl. No.: 16/712,531

(22) Filed: Dec. 12, 2019

(65) Prior Publication Data
US 2021/0182046 A1   Jun. 17, 2021

(51) Int. Cl.
| | |
|---|---|
| *G06F 8/65* | (2018.01) |
| *G06Q 10/00* | (2012.01) |
| *G06Q 10/10* | (2012.01) |
| *G06N 5/04* | (2006.01) |

(52) U.S. Cl.
CPC .............. *G06F 8/65* (2013.01); *G06N 5/04* (2013.01); *G06Q 10/1097* (2013.01); *G06Q 10/20* (2013.01)

(58) Field of Classification Search
CPC ...................................................... G06F 8/65
See application file for complete search history.

(56) References Cited

U.S. PATENT DOCUMENTS

| | | | | |
|---|---|---|---|---|
| 4,625,279 A | * | 11/1986 | Zuber | B61L 25/021 246/182 R |
| 6,199,110 B1 | * | 3/2001 | Rizvi | H04L 67/1034 709/227 |
| 6,522,939 B1 | * | 2/2003 | Strauch | G05B 19/41875 700/116 |
| 10,951,472 B2 | * | 3/2021 | Kondo | H04L 41/5003 |
| 2002/0156624 A1 | * | 10/2002 | Gigi | G10L 21/0208 704/226 |
| 2003/0156301 A1 | * | 8/2003 | Kempf | H04N 7/012 358/486 |
| 2003/0171836 A1 | * | 9/2003 | Yajima | G05B 19/4065 700/108 |
| 2007/0054668 A1 | * | 3/2007 | Scheinert | H04L 63/101 455/435.1 |
| 2008/0052067 A1 | * | 2/2008 | Morito | G10L 21/0208 704/226 |

(Continued)

*Primary Examiner* — Jae U Jeon
(74) *Attorney, Agent, or Firm* — Foley & Lardner LLP

(57) ABSTRACT

Described implementations provide systems and methods for automated maintenance of computing devices. The automated maintenance of computing devices may receive, by a management system from a server device providing services to a plurality of client devices, performance values for a plurality of time periods. The automated maintenance of computing devices may calculate, by the management system, for each time period, a score as a weighted sum of the performance values corresponding to the time period, the plurality of calculated scores stored in an array. The automated maintenance of computing devices may select, by the management system based on the array, a maintenance time for the server device. The automated maintenance of computing devices may initiate maintenance of the server device, responsive to a present time corresponding with the maintenance time for the server device.

20 Claims, 5 Drawing Sheets

(56) References Cited

U.S. PATENT DOCUMENTS

| | | | |
|---|---|---|---|
| 2008/0270077 A1* | 10/2008 | Ozonat | G06F 11/3409 |
| | | | 702/186 |
| 2015/0381425 A1* | 12/2015 | Kansal | H04L 41/0896 |
| | | | 709/224 |
| 2019/0340519 A1* | 11/2019 | Bender | G07C 5/085 |
| 2020/0028882 A1* | 1/2020 | Joshi | H04L 65/1083 |

* cited by examiner

SYSTEMS AND METHODS FOR MACHINE LEARNING BASED EQUIPMENT MAINTENANCE SCHEDULING

FIELD OF THE DISCLOSURE

The present application generally relates to computing systems and infrastructure, including but not limited to systems and methods for updating computing workspaces.

BACKGROUND

For implementations of cloud services serving user traffic with the help of distributed components or on-premise server devices, the management of these server devices has multiple challenges. In many implementations, server device management may be handled by the cloud service and managing upgrades, bug fixes, and feature updates for server devices may present particular challenges. Based on the upgrade mechanisms used and the underlying infrastructure, such upgrades or updates can take an undetermined amount of time, sometimes referred to as a maintenance window. The longer the time taken for the upgrade, the more crucial the selection of this time window is since during this time the server device is going to be non-operational for serving user traffic. For example, scheduling maintenance windows during peak working hours may lead to lost connections or user outages. Moreover, scheduling these maintenance windows becomes more challenging as the number of independent server devices and user traffic increases.

SUMMARY

This Summary is provided to introduce a selection of concepts in a simplified form that are further described below in the Detailed Description. This Summary is not intended to identify key features or essential features, nor is it intended to limit the scope of the claims included herewith.

This disclosure describes a method and system for determining the best upgrade time of distributed components such as, but no limited to, customer on premise infrastructure and for scheduling such upgrade times. To find the best upgrade time, in some implementations, a machine learning system may use an algorithm to analyze the usage pattern of each server device and predict the time it would be in least use and co-ordinate this time with the other server devices to provide an outage free upgrade for the customer.

An aspect of the disclosure provides for automated maintenance of computing devices. The disclosure comprises a management system, a network interface, a computing device, a processor, a server device, and a client device. The disclosure uses performance values representing a plurality of time periods to calculate for each time period, scores corresponding to the time periods. The disclosure can also store the scores in an array. A maintenance time for the server device can be selected based on the data in the array, and maintenance of the server device will be initiated during the selected time.

In one aspect, this disclosure is directed to a method for automated maintenance of computing devices. The method includes receiving, by a management system from a server device providing services to a plurality of client devices, performance values for a plurality of time periods. The method also includes calculating, by the management system, for each time period, a score as a weighted sum of the performance values corresponding to the time period, the plurality of calculated scores stored in an array. The method also includes selecting, by the management system based on the array, a maintenance time for the server device. The method also includes responsive to a present time corresponding with the maintenance time for the server device, initiating maintenance of the server device.

In some implementations, the performance values comprise one or more of a processor utilization, a memory utilization, a network throughput, and a number of active connections. In some implementations, selecting the maintenance time for the server device further comprises converting, by the management system, the array of the plurality of calculated scores from a time domain into a frequency domain; applying, by the management, a noise reduction function to the converted array; and converting, by the management system, the noise reduced converted array from the frequency domain into the time domain to generate an array of predicted scores; wherein the maintenance time is selected based on a time period corresponding to a highest score or lowest score, in various implementations (e.g. corresponding to a period of lowest server usage time) of the array of predicted scores. In certain implementations, the noise reduction function comprises a low pass filter. In certain implementations, the noise reduction function comprises removing frequencies having amplitudes below a threshold. In certain implementations, the threshold is determined based on a highest amplitude frequency.

In some implementations, initiating maintenance of the server device further comprises deregistering services provided by the server device. In certain implementations, initiating maintenance of the server device further comprises directing the server device to close each connection of the server device with a client device, responsive to the connection becoming idle. In certain implementations, initiating maintenance of the server device further comprises performing an upgrade or maintenance procedure on the server device, responsive to all client connections of the server device being closed. In some implementations, the method includes providing an identification of the maintenance time for the server device to the server device; and the server device initiates maintenance, responsive to receipt of the identification of the maintenance time for the server device and responsive to the present time corresponding with the maintenance time for the server device.

In another aspect, this disclosure is directed to a system for automated maintenance of computing devices, comprising: a computing device comprising a network interface in communication with a server device providing services to a plurality of client devices, and a processor; wherein the network interface is configured to receive, from the server device, performance values for a plurality of time periods; wherein the processor is configured to: calculate, for each time period, a score as a weighted sum of the performance values corresponding to the time period, the plurality of calculated scores stored in an array, and select, based on the array, a maintenance time for the server device, and responsive to a present time corresponding with the maintenance time for the server device, initiate maintenance of the server device.

In some implementations, the performance values comprise one or more of a processor utilization, a memory utilization, a network throughput, and a number of active connections. In some implementations, the processor is configured to select the maintenance time for the server device by: converting the array of the plurality of calculated scores from a time domain into a frequency domain; applying a noise reduction function to the converted array; and converting the noise reduced converted array from the frequency domain into the time domain to generate an array of predicted scores; wherein the maintenance time is selected based on a time period corresponding to a highest score or lowest score, in various implementations (e.g. corresponding to a period of lowest server usage time) of the array of predicted scores. In certain implementations, the noise reduction function comprises a low pass filter. In certain implementations, the noise reduction function comprises removing frequencies having amplitudes below a threshold. In certain implementations, the threshold is determined based on a highest amplitude frequency.

In some implementations, the processor is further configured to deregister services provided by the server device. In certain implementations, the processor is further configured to direct the server device to close each connection of the server device with a client device, responsive to the connection becoming idle. In certain implementations, the processor is further configured to perform an upgrade or maintenance procedure on the server device, responsive to all client connections of the server device being closed. In some implementations, the processor is configured to provide an identification of the maintenance time for the server device to the server device; and the server device initiates maintenance, responsive to receipt of the identification of the maintenance time for the server device and responsive to the present time corresponding with the maintenance time for the server device.

In another aspect, this disclosure is directed to a non-transitory computer-readable medium comprising instructions that, when executed by a processor of a computing device, cause the computing device to: receive, from a server device, performance values for a plurality of time periods; calculate, for each time period, a score as a weighted sum of the performance values corresponding to the time period, the plurality of calculated scores stored in an array; select, based on the array, a maintenance time for the server device; and responsive to a present time corresponding with the maintenance time for the server device, initiate maintenance of the server device. In some implementations, initiating maintenance of the server device includes providing an identification of the maintenance time for the server device to the server device; and the server device initiating maintenance, responsive to receipt of the identification of the maintenance time for the server device and responsive to the present time corresponding with the maintenance time for the server device.

In some implementations, the computer-readable medium further comprising instructions that, when executed by the processor, cause the computing device to: convert the array of the plurality of calculated scores from a time domain into a frequency domain; apply a noise reduction function to the converted array; and convert the noise reduced converted array from the frequency domain into the time domain to generate an array of predicted scores; wherein the maintenance time is selected based on a time period corresponding to a highest score or lowest score, in various implementations (e.g. corresponding to a period of lowest server usage time) of the array of predicted scores.

BRIEF DESCRIPTION OF THE DRAWING FIGURES

Objects, aspects, features, and advantages of implementations disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating implementations, principles and concepts. The drawings are not intended to limit the scope of the claims included herewith.

DETAILED DESCRIPTION

For purposes of reading the description of the various implementations below, the following descriptions of the sections of the specification and their respective contents may be helpful:

Section A describes a computing environment which may be useful for practicing implementations described herein; and Section B describes systems and methods for automated maintenance of computing devices.

A. Computing Environment

Prior to discussing the specifics of implementations of the systems and methods for automated maintenance of computing devices, it may be helpful to discuss the computing environments in which such implementations may be deployed.

Figure 1A:
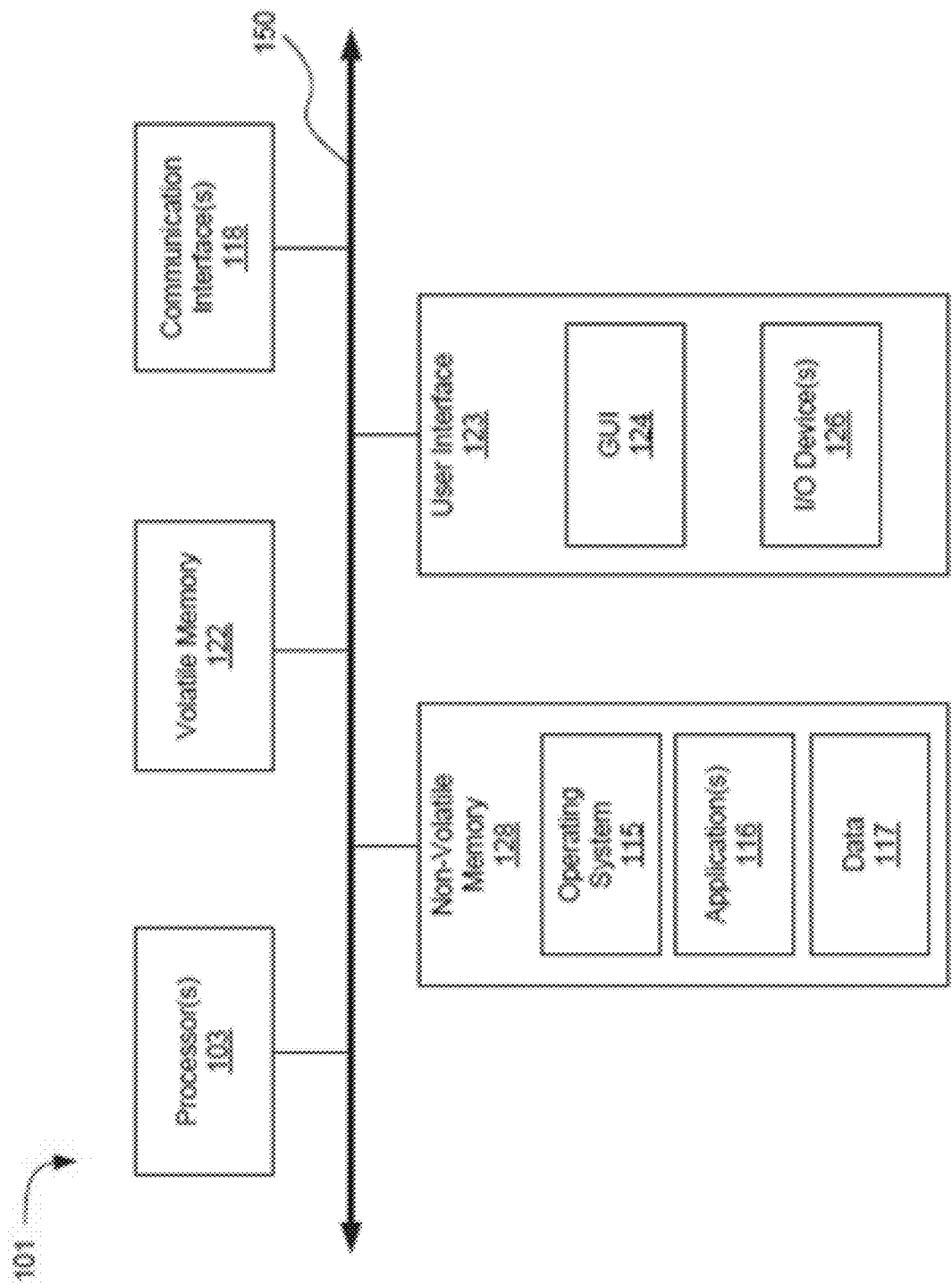
FIG. 1A is a block diagram of implementations of a computing device.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some implementations, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some implementations, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described implementations, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Figure 1B:
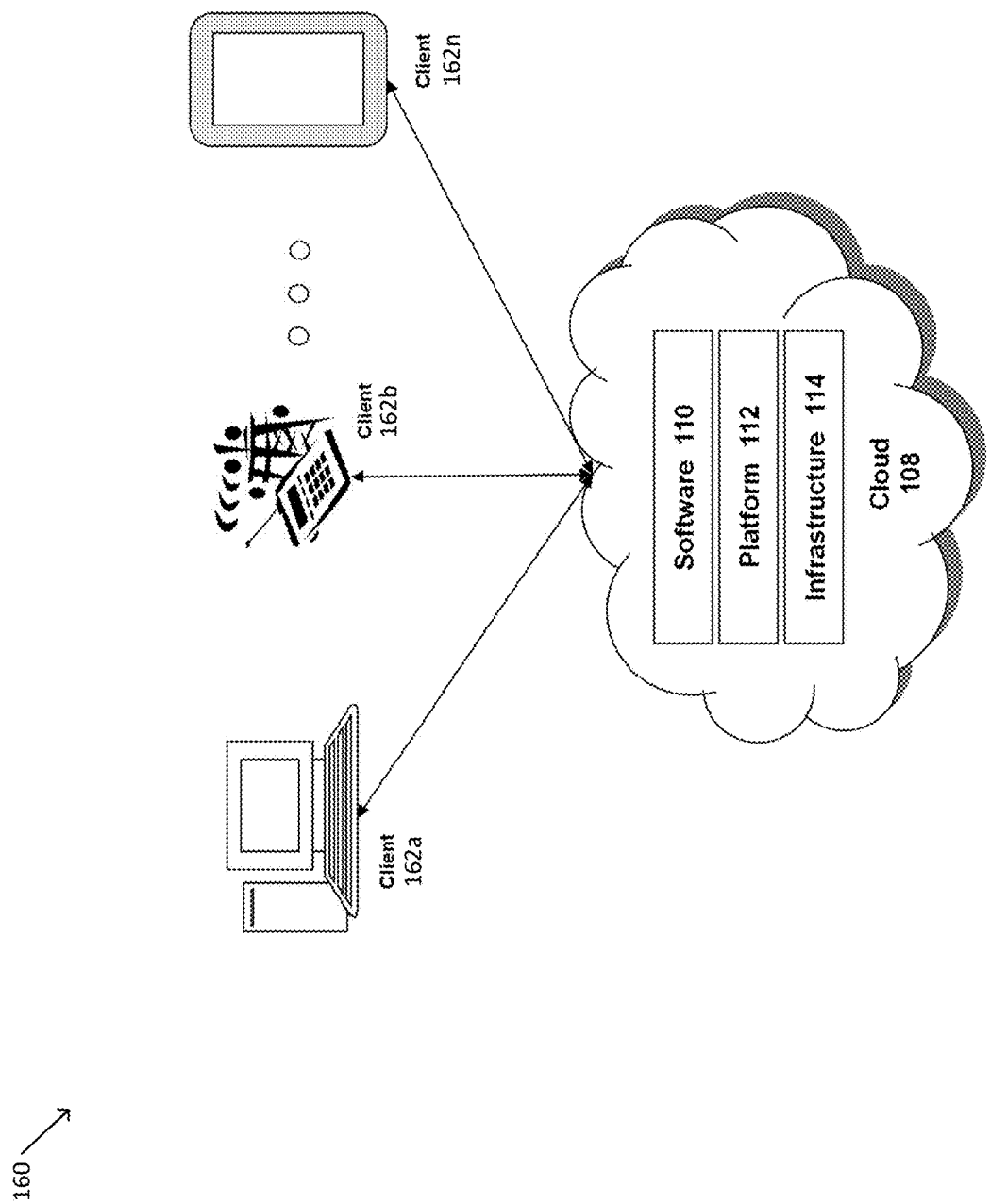
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In implementations, the computing environment 160 may provide client 162 with one or more resources provided by a network environment. The computing environment 162 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In implementations, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In implementations, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some implementations, the computing environment 160 can include or provide monitoring services to monitor, control and/or generate reports corresponding to the provided shared services and resources.

In some implementations, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some implementations, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some implementations, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Automated Maintenance of Computing Devices

For any cloud service serving user traffic with the help of distributed computing devices or components at data center or enterprise locations such as branch offices, the management of these distributed computing devices may present multiple challenges. For example, some distributed computing devices, sometimes referred to as server devices, may serve as proxies to direct communications between user devices and application servers, data servers, cloud servers, or other such devices. The server devices may thus represent a "chokepoint" for many user devices and servers and a failure of such devices—or disabling such devices for upgrades or maintenance—may result in loss of connections and impaired user experiences for many users and many application servers.

The server device management may be handled by the cloud service and managing the upgrades for the server device may be particularly challenging. There are frequent bug fixes and feature updates required by the server device to deliver the best experience. Based on the upgrade mechanisms used and the underlying infrastructure, this upgrade can take an undetermined amount of time. This time window can be known as the maintenance window. The longer the time taken for the upgrade, the more crucial the selection of this time window is since during this time the server device is going to be non-operational for serving user traffic since its undergoing the upgrade. Any time during the peak working hours and this would lead to lot of established connections getting closed and may result in an outage for the customer as well for this time duration. Moreover, this problem becomes more challenging when it comes to multiple server devices acting independently. The present disclosure solves the issue of finding an optimal maintenance time by using machine learning to determine the best upgrade period for distributed components in customer on-premise infrastructure.

Figure 2:
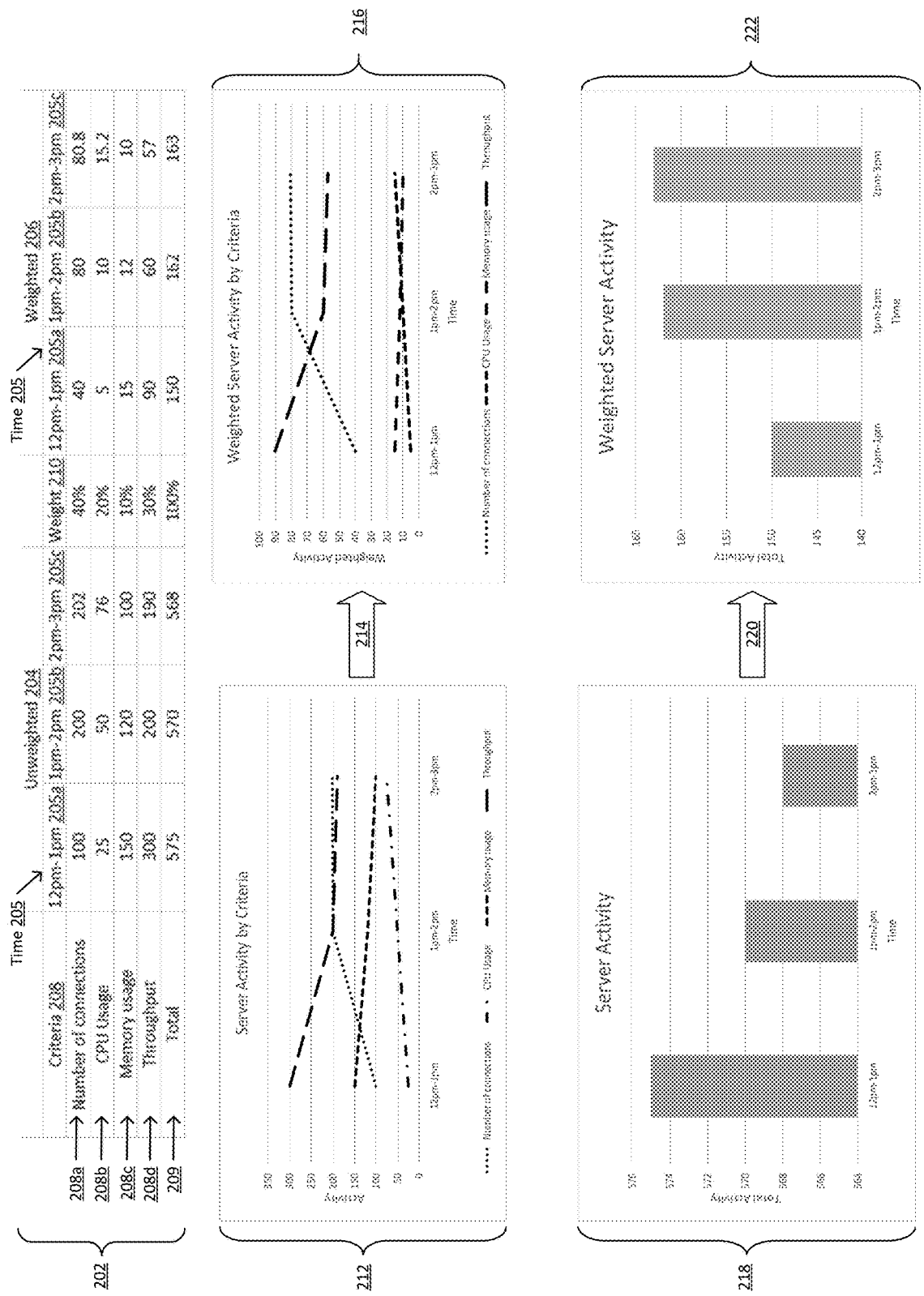
FIG. 2 is an example implementation of the weighting scoring model depicting the prioritization of parameters based on their importance to find a maintenance time.

Referring to FIG. 2, depicted is a table of time series data and its graphical representation. The section 202 includes a unweighted 204 section for storing activity data for one or more time periods 205a-205c (generally referred to as time period(s) 205). The section 202 includes a criteria 208 column for representing one or more criteria rows. The criteria 208 includes rows of individual criteria such as number of connections 208a, CPU usage 208b, memory usage 208c, and throughput 208d. Criteria can generally be referred to using reference numeral 208. The section 202 includes a weighted 206 section for storing weighted activity data for one or more time periods 205. The data of each column is tabulated into a total 209. The section 202 includes a weight 210 column for storing the weight value for each criteria. The data in weighted 206 is calculated based on the data in unweighted 204 as adjusted by weight 210. The data in section 204 is represented in graph 212. The graph 212 plots the time series data for each criteria 208 for each time 205. Step 214 uses the weight 210 to convert graph 212 into graph 216. The data in section 206 is represented in graph 216. The graph 216 plots the time series data for each criteria 208 for each time 205. The total 209 of time 205 of section 204 is represented in graph 218. The graph 218 plots the total 209 for each criteria 208 of each time 205 of section 204. Step 220 uses the weight 210 to convert graph 218 into graph 222. The total 209 of time 205 of weighted 206 is represented in graph 222. The graph 222 plots the time series data of the total 209 of each criteria 208 for each time 205 of weighted 206.

In further detail, section 202 includes the total 209 for unweighted 204 shows the activity from most to least as 12 pm-1 pm 205*a*, 1 pm-2 pm 205*b*, and 2 pm-3 pm 205*c* in the example illustrated. But after applying the weight 210 to the data of 204, the total 209 for weighted 206 shows that the activity from most to least as 2 pm-3 pm 205*c*, 1 pm-2 pm 205*b*, and 12 pm-1 pm 205*a* in the example illustrated. Therefore, the weight 210 has reordered the activity ordering.

In further detail, graph 212 shows activity broken down by criteria 208*a*-208*d* of unweighted 204. There is generally more activity at 12 pm-1 pm, followed by a decrease to 1 pm-2 pm, and a further decrease at 2 pm-3 pm in the example illustrated.

In further detail, step 214 converts the graph 212 to graph 216 by applying the weight 210 to the data of unweighted 204.

In further detail, graph 216 shows activity broken down by criteria 208*a*-208*d* of weighted 206. The graph 216 shows more activity at 2 pm-3 pm, followed by a decrease to 1 pm-2 pm, and a further decrease at 12 pm-1 pm in the example illustrated. The relative activity is opposite to the relative activity seen in graph 212.

In further detail, graph 218 shows total 209 activity broken down by time 205 of unweighted 204. There is generally more activity at 12 pm-1 pm, followed by a decrease to 1 pm-2 pm, and a further decrease at 2 pm-3 pm in the example illustrated.

In further detail, step 220 converts the graph 218 to graph 222 by applying the weight 210 to the total 209 data of unweighted 204.

In further detail, graph 222 shows total 209 activity broken down by time 205 of weighted 206. The graph 222 shows more activity at 2 pm-3 pm, followed by a decrease to 1 pm-2 pm, and a further decrease at 12 pm-1 pm in the example illustrated. The relative activity is opposite to the relative activity seen in graph 218.

Figure 3:
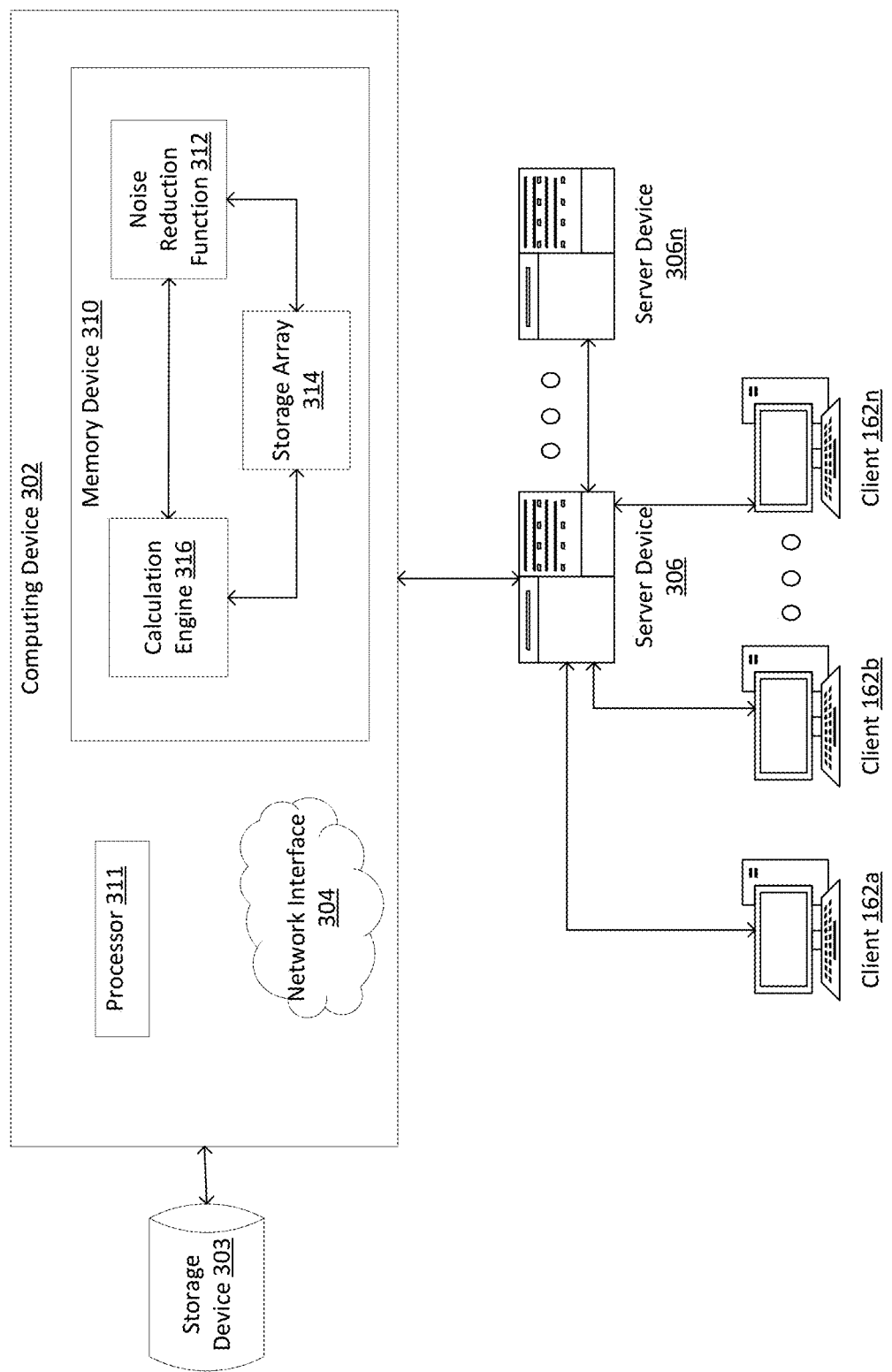
FIG. 3 is a system figure depicting a computing environment in which various aspects of the disclosure may be implemented.

Referring to FIG. 3, illustrated is an implementation of a system for automated maintenance of computing devices. The system includes a computing device 302 comprising a network interface 304, a memory device 310, and a processor 311. The network interface 304 is communicatively coupled to the server device 306. The memory device 310 comprises a noise reduction function 312, a storage array 314, and a calculation engine 316. The noise reduction function 312, the storage array 314, and the calculation engine 316 are all communicatively coupled to each other. The processor 311 can access the memory device 310. The server device 306 is communicatively coupled to one or more clients 162.

In further detail, the computing device 302 can be known as a controller. The computing device 302 may be registered in a Data Point-of-Presence (POP) server. The computing device 302 can register or deregister a server device 306. The computing device 302 can connect to the server device 306. The computing device 302 can receive the status of an upgrade lock. The computing device 302 can comprise the network interface 304, the memory device 310, and the processor 311. The computing device 302 can comprise a non-transitory computer-readable medium including instructions for execution by a processor, and such medium may be part of the computing device 302 or in a storage device 303 accessed by the computing device 302. The computing device 302 can have the processor 311 execute instructions. The instructions can cause the computing device 302 to receive performance values for a plurality of time periods from the server device 306. The computing device 302 can calculate, for each time period, a score as a weighted sum of the performance values corresponding to the time period, the plurality of calculated scores stored in the storage array 314. The computing device 302 can select, based on the storage array 314, a maintenance time for the server device 306. The computing device 302 can, responsive to a present time corresponding with the maintenance time for the server device 306, initiate maintenance of the server device 306. The computing device 302 can convert the storage array 314 of the plurality of calculated scores from a time domain into a frequency domain. The computing device 302 can apply a noise reduction function to the converted storage array 314. The computing device 302 can convert the noise reduced converted storage array 314 from the frequency domain into the time domain to generate an array of predicted scores, wherein the maintenance time is selected based on a time 205 period corresponding to a highest score of the array of predicted scores, or a lowest score of the array of predicted scores, depending on implementation (e.g. whether a high score or low score corresponds to the server being least active).

In further detail, the network interface 304 can be known as a delivery network. The network interface 304 can receive performance values or data for a plurality of time periods from the server device 306.

In further detail, the processor 311 can execute a noise reduction function 312, a storage array 314, and a calculation engine 316. The processor 311 can calculate, for each time period, a score as a weighted sum of the performance values corresponding to the time period, the plurality of calculated scores stored in a storage array 314. The processor 311 can select, based on the array, a maintenance time for the server device 306. The processor 311 can initiate maintenance of the server device responsive to a present time (e.g. local time of the computing device 302, a universal time, a local time at a location of the server device, etc.) corresponding with the maintenance time for the server device. The processor 311 can select a maintenance time for the server 306 by converting the array of the plurality of calculated scores from a time domain into a frequency domain. The processor 311 can apply a noise reduction function 312 to the converted storage array 314. The processor 311 can convert the noise reduced converted storage array 314 from the frequency domain into the time domain to generate a storage array 314 of predicted scores, wherein the maintenance time is selected based on a time period corresponding to a highest score or lowest score (i.e. corresponding to a least active time period) of the storage array 314 of predicted scores. The processor 311 can deregister services provided by the server device 306. The processor 311 can direct the server device 306 to close each connection of the server device with a client 162, responsive to the connection becoming idle. Such connection closing may be performed by the server device (e.g. upon detecting an idle connection) in many implementations, and accordingly, directing the server device to close idle connections may comprise informing the server device of a maintenance period. The processor 311 can perform an upgrade or maintenance procedure on the server device 306, responsive to all client connections of the server device being closed. In some implementations, performing the upgrade or maintenance procedure may comprise initiating the upgrade or maintenance procedure, directing another device to initiate the upgrade or maintenance procedure, or informing the server device of the maintenance period such that the server device may initiate the upgrade or maintenance procedure.

In further detail, the noise reduction function 312 can be applied to the storage array 314. The noise reduction function 312 can comprise a low pass filter, a high pass filter, a band-pass filter, or a band-stop filter. The noise reduction function 312 can remove frequencies having amplitudes below and/or above a threshold. The noise reduction function 314 can comprise a Fast Fourier Transformation (FFT). The FFT can convert the storage array 314 from a time domain to a frequency domain. The most dominant frequencies may be identified from the FFT-converted data. The most dominant frequencies may be those having the highest amplitude, those having the most energy over a frequency range (e.g. determined via integration of sliding windows under the converted data curve), those having a highest total amplitude of a fundamental frequency and harmonic frequencies, or any other such method. In many implementations, the FFT application can be accelerated by having the number of samples be an exponent of 2. In some implementations, filtering can be applied to the storage array 314 to filter data based on amplitude or frequency. For example, one filtering policy may be to filter low amplitude, high frequency signals from the converted data. In some implementations, the filtering occurs if the frequency data is not within a functional range (e.g. above a first predetermined frequency threshold, or below a second predetermined frequency threshold). In some implementations, the signal may be de-noised by removing irregularities. The FFT can apply forecasting on selected frequencies by shifting the phase on the observations and recombining them by applying the inverse FFT on them to generate the predicted values in the time series format.

In further detail, the storage array 314 can store time-series data or frequency data. The storage array 314 can store collected or calculated data. The storage array 314 can comprise a plurality of calculated scores. The storage array 314 can be converted from a time domain into a frequency domain. A noise reduction function 312 can be applied to the converted storage array 314. The storage array 314 can be converted from the frequency domain into the time domain. The storage array 314 can include predicted scores. The storage array 314 can identify the highest score or lowest score (depending on implementation) of the array of predicted scores.

In further detail, the calculation engine 316 can calculate for each time period, a score as a weighted sum of the performance values corresponding to the time period, the plurality of calculated scores stored in the storage array 314. The calculation engine 316 can convert the storage array 314 of the plurality of calculated scores from a time domain into a frequency domain. The calculation engine 316 can convert the noise reduced converted array from the frequency domain into the time domain to generate an array of predicted scores. The calculation engine 316 may use an algorithm to calculate an upgrade window based on historical usage statistics of the server device 306 as well as other server devices, application servers, and client 162. In some implementations, the upgrade window may be known as the maintenance window. The maintenance window may be initially set to a "default time". The calculation engine 316 may receive "activity metrics" or measurements of performance from a computing device 302 or management server at periodic time intervals from the server device 306 as it starts serving traffic. In some implementations, the time intervals can be every ten minutes, hourly, daily, weekly, or at any other such interval. The activity metrics can comprise information about active connections, such as a number of connections, data rates of connections or amount of data transferred, latency of connections, loss rates of connections, type of data being transmitted (e.g. application layer protocols such as HTTP or SMTP data, presentation layer protocols such as RDP or ICA, etc.); memory utilization; CPU usage, or any other such information. Based on the activity metrics, the calculation engine 316 can calculate a current optimum maintenance window for the server device 306 based on identification of a lowest activity period over a period of data points. The optimum maintenance window can change based on the customer traffic and locations, devices, and servers utilized. The optimum maintenance window can change automatically without the need for reconfiguring.

The calculation engine 316 can use heuristics to predict optimum windows for server device upgrades across a plurality of server devices 306n. In many implementations, the heuristics may consider one or more of: a number of connections (C), a CPU usage (U), a memory usage (M), a throughput (B), and a time over which these parameters are reported, as well as any other connection or performance information. In some implementations, the time over which these parameters are reported may be minute-long windows, hour-long windows, daily windows, or any other such time frame. In some implementations, different time frames may be utilized for different days or times. For example, in some implementations, daily time windows may be used on weekends, with hourly or minute-long windows used during peak working hours during a work week. This may allow for varying levels of granularity of metrics based on when they may be most relevant, and may reduce processing and network requirements for monitoring during less relevant or less important time periods.

The calculation engine 316 can include a formula for measuring activity. The formula can be represented as Activity $(A_t)$ at time t=f(C, B, U, M). The calculation engine can receive the average of each of these parameters during the time window from the server device 306. In some implementations, a "Weighted Scoring Model" can prioritize the parameters based on their importance. Each parameter may be assigned a percentage or score based on its importance in determining the "Activity" of the server device. For example, Table 1 illustrates weights that may be applied to each score, in some implementations:

TABLE 1

| Criteria | Weight |
| --- | --- |
| Number of Connections (C) | 40% |
| CPU Usage (U) | 20% |
| Memory Usage (M) | 10% |
| Throughput (B) | 30% |

In some implementations, the total of the weights adds up to 100%, while in other implementations, the weights may be considered scaling coefficients and may add up to more or less than 100% (e.g. weights of 0.8, 0.5, 0.3, and 0.4 for the above criteria). Using the weights provided in the example table above, the function may be expanded as $A_t=0.4*C_t+0.2*U_t+0.1*M_t+0.3*B_t$. The weighted activity value can be calculated for any time period, such as every hour or every day. For example, Table 2 illustrates a time series of example scores for each criterion, in some implementations:

TABLE 2

| Criteria | Weight | Time | | |
|---|---|---|---|---|
| | | 12-1pm | 1-2pm | 2-3pm |
| C | 40% | 200 | 150 | 75 |
| U | 20% | 10 | 15 | 40 |
| M | 10% | 40 | 20 | 10 |
| B | 30% | 200 | 350 | 400 |
| | | Total = 146 | Total = 170 | Total = 159 |

Based on the above calculations, the calculation engine 316 can periodically adjust or update activity scores based on the data in Table 1. Based on the example criteria and example weights shown in Table 2, the example server device 306 may be considered "least active" between 12-1 pm out of the three sample time ranges (despite, for example, having a higher number of active connections or using more memory than the 1-2 pm or 2-3 pm windows). Thus, the "least active" time may reflect the overall metrics, rather than any one or two individual metrics.

In further detail, the server device 306 can be known as a connector. The server device 306 can be communicatively coupled to one or more clients 162. The server device 306 can transmit performance values for a plurality of time periods to the network interface 304. The server device 306 can include a maintenance time. The server device 306 can be controlled based on a maintenance time. The server device 306 can initiate maintenance of itself responsive to a present time corresponding with the maintenance time. Accordingly, in many implementations, initiating maintenance as used herein may refer to informing the server device of a schedule maintenance time such that the server device 306 subsequently initiates maintenance responsive to the present time corresponding with the maintenance time. The server device 306 can have its maintenance time selected by the computing device 302, the processor 311, the calculation engine 316, the storage array 314, or the noise reduction function 312. The server device 306 can provide services. The server device 306 can have its services deregistered. The server device 306 can close its connections with a client 162, responsive to the connection becoming idle. The server device 306 can undergo an upgrade or maintenance procedure, responsive to all client 162 connections of the server device 306 being closed.

In further detail, the client 162 can receive services from the server device 306. The client 162 can establish a connection with the server device 306. The client 162 can have its connection with the server device 306 closed, open, or idle. The client 162 can form the basis of activity metrics such as number of connections, CPU Usage, Memory Usage, Throughput, or any other criteria 208.

Each of the above-mentioned elements or entities is implemented in hardware, or a combination of hardware and software, in one or more implementations. Each component of the FIG. 3 may be implemented using hardware or a combination of hardware or software detailed above in connection with FIGS. 1A-1B. For instance, each of these elements or entities can include any application, program, library, script, task, service, process or any type and form of executable instructions executing on hardware of a client 162. The hardware includes circuitry such as one or more processors in one or more implementations.

Figure 4:
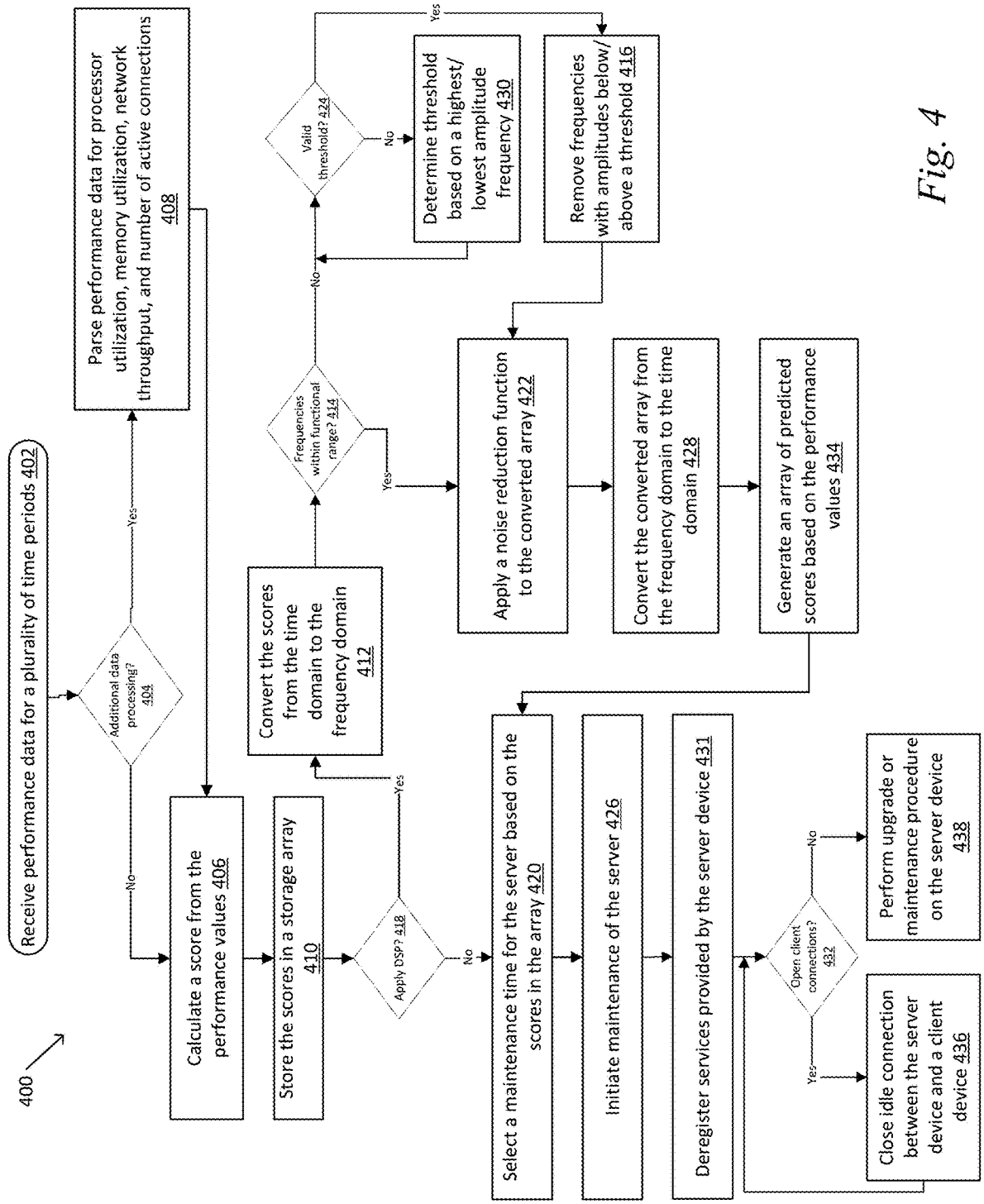
FIG. 4 is a flow diagram of an implementation of a method for automated maintenance of computing devices.

Referring to FIG. 4, depicted is a flow diagram of one implementation of a method 400 for determining best upgrade period for distributed components. The functionalities of the method may be implemented using, or performed by, the components detailed herein in connection with FIGS. 1-3. In brief overview, a performance data can be obtained (step 402). A maintenance time is selected based on the performance data (step 420). The maintenance procedure is performed (step 438).

In one implementation, the method 400 can apply when there is only one server device 306. Since the customer has only one server device and nothing to fallback to serve the traffic during upgrade, the heuristic approach of the present disclosure can still optimize the experience by finding the best time to remove the sole server device from service.

In an alternate implementation, the method 400 can operate when there is a plurality of server devices 306. The second case is when the customer has multiple server devices 306 in one data center. Having multiple server devices 306 allows some of them to be taken offline without a service disruption.

The method 400 can include step 402, receiving performance data for a plurality of time periods. The performance data can come from one or more server devices 306n. Step 402 can include populating section 202. The performance data can be in a non-standardized format. Step 402 can include receiving the average of one or more parameters during a plurality of time periods. The parameters can include criteria 208.

The method 400 can include step 404, a decision block for additional data processing. If additional data processing isn't needed, step 404 can proceed to step 406. If additional data processing is needed, step 404 can proceed to step 408. The decision can be made by the computing device 302 or processor 311.

The method 400 can include step 408, parsing performance data for processor utilization, memory utilization, network throughput, and number of active connections, or any other such metrics. For example, performance data may be received as server logs and the metrics may be extracted or parsed from the data, e.g. based on predetermined fields, XML tags, syntax (e.g. times as nn:nn:nn, etc.), or any other such identifiers. The parsed performance data can be grouped by criteria 208. The parsed performance data can be grouped such as unweighted 204 and weighted 206. The parsed performance data can be grouped by time such as 205a, 205b, and 205c.

The method 400 can include step 406, calculate a score from the performance values. The score can represent the total 209. The score can be calculated by the calculation engine 316. Step 406 can include calculating a score from values in a time series or frequency format. Step 406 can include using a formula for measuring activity. The formula can be represented as Activity ($A_t$) at time t=f (C, B, U, M). In some implementations, a "Weighted Scoring Model" can prioritize the criteria 208 based on their importance. The function may comprise a linear function, non-linear function, piecewise linear function, etc. For example, in some implementations, the weighted activity value may comprise a plurality of predetermined activity levels corresponding to thresholds or boundaries for a sum of the component values, while in other implementations, the weighted activity value may comprise a sum of weighted component values. Each criteria 208 may be assigned a percentage or score based on its importance in determining the "Activity" of the server device 306. The weighted activity value can be calculated for any time period, such as every hour or every day.

The method 400 can include step 410, storing the scores in a storage array 314. The time-series scores can be stored in a time-series database. The method can include storing any of the values in section 202. The activity scores may be adjusted or updated periodically.

The method 400 can include step 418, a decision block for applying digital signal processing (DSP). If additional DSP isn't needed, step 404 can proceed to step 420. If additional data processing is needed, step 420 can proceed to step 412. The decision can be made by the computing device 302 or processor 311.

The method 400 can include step 412, converting the scores from the time domain to the frequency domain. The conversion can be performed by the noise reduction function 312. The FFT may be applied to this data to convert the data from a time domain to a frequency domain. In some implementations, the FFT application can be accelerated by having the number of samples be an exponent of 2.

The method 400 can include step 414, a decision block for determining if the frequencies are within a functional range. If the frequencies are not within a functional range, step 414 can proceed to step 424. If the frequencies are within a functional range, step 414 can proceed to step 422. The decision can be made by the computing device 302 or processor 311.

The method 400 can include step 424, a decision block for determining if there is a valid frequency threshold. If the frequencies threshold is not valid, step 424 can proceed to step 430. If the frequencies are valid, step 424 can proceed to step 416. The decision can be made by the computing device 302 or processor 311.

The method 400 can include step 430, determining a threshold based on a highest or lowest amplitude frequency. The most dominant frequencies may be identified from the FFT-converted data. The most dominant frequencies may be those having the highest amplitude, those having the most energy over a frequency range (e.g. determined via integration of sliding windows under the converted data curve), those having a highest total amplitude of a fundamental frequency and harmonic frequencies, or any other such method.

The method 400 can include step 416, removing frequencies with amplitudes below or above a threshold. The threshold can be obtained from the user, or any of the elements described herein. In some implementations, removing frequencies is done to filter data based on amplitude or frequency. For example, one filtering policy may be to filter low amplitude, high frequency signals from the converted data. In some implementations, the filtering occurs if the frequency data is not within a functional range (e.g. above a first predetermined frequency threshold, or below a second predetermined frequency threshold).

The method 400 can include step 422, applying a noise reduction function 312 to the converted storage array 314. In some implementations, the signal may be de-noised by removing irregularities. In an alternative implementation, the noise reduction function 312 is an FFT function.

The method 400 can include step 428, converting the converted storage array 314 from the frequency domain to the time domain. In some implementations, step 428 can include plotting the generated data, such as $A_t = \forall t \in T$ where the total number of samples of $A_t = 2^N$, to obtain time series data. The conversion can occur for scores of one or more server devices 306n.

The method 400 can include step 434, generating an array of predicted scores based on the performance values 434. Step 434 can forecast or predict the activity of one or more server devices 306n. In some implementations, the optimum time is predicted. The FFT can apply forecasting on selected frequencies by shifting the phase on the observations and recombining them by applying the inverse FFT on them to generate the predicted values in the time series format. Based on the above predicted scores, the activity scores may be adjusted or updated periodically in the storage array 314. Step 434 can include using an algorithm to calculate an upgrade window based on historical usage statistics of one server devices 306 as well as other server devices 306n, application servers, and/or client devices. The maintenance window may be initially set to a "default time". The "default time" may be set by a user or any of the components described herein. In some implementations, the server device 306 may initially be configured with a default maintenance window. As the server device 306 starts serving traffic, it may send "activity metrics" or measurements of performance to a management server or a computing device 302 at periodic time intervals. In some implementations, the time intervals can be every ten minutes, hourly, daily, weekly, or at any other such interval. The activity metrics can comprise information about active connections, such as a number of connections, data rates of connections or amount of data transferred, latency of connections, loss rates of connections, type of data being transmitted (e.g. application layer protocols such as HTTP or SMTP data, presentation layer protocols such as RDP or ICA, etc.); memory utilization; CPU usage, or any other such information. Based on the activity metrics, the management server, the computing device 302, the processor 311, or the calculation engine 316 can calculate a current optimum maintenance window for the server device 306 based on identification of a lowest, highest, or other particular activity period over a period of data points. The optimum maintenance window can change based on the customer traffic and locations, devices, and servers utilized. The optimum maintenance window can change automatically without the need for reconfiguring.

In an alternative implementation, step 434 can use heuristics to predict optimum windows for the server device 306 upgrade across a plurality of server devices 306. In some implementations, the heuristics may consider one or more of: a number of connections (C), a CPU usage (U), a memory usage (M), a throughput (B), and a time over which these parameters are reported, as well as any other connection or performance information. In some implementations, the time over which these parameters are reported may be minute-long windows, hour-long windows, daily windows, or any other such time frame. In some implementations, different time frames may be utilized for different days or times. For example, in some implementations, daily time windows may be used on weekends, with hourly or minute-long windows used during peak working hours during a work week. This may allow for varying levels of granularity of metrics based on when they may be most relevant, and may reduce processing and network requirements for monitoring during less relevant or less important time periods.

In an alternative implementations, step 436 can include a server device uploading telemetry data to a management server, computing device, or processor 311. The upload can occur via the network interface 304. In some implementations, the management server or computing device 302 may aggregate telemetry data from multiple server devices 306 to predict a best upgrade time for each server device 306.

The method 400 can include step 420, selecting a maintenance time for the server based on the scores in the storage array 314. The most optimum "activity time" can be calculated from the predicted values. The "activity time" may be a profile representing the activity of one or more server devices 306n at a particular time. The "activity time" may be based on the criteria 208 and weight 210. The "activity time"

for the server device 306 may result in it being considered "least active" during one or more times 205, "most active" during one or more times 205, or any other label of activity. The "activity time" can be based on metrics. Step 420 can include making selection based on the overall metrics, rather than any one or two individual metrics. Step 420 can include making a selection based on one or two individual metrics. The metrics can be based on criteria 208, time 205, weight 210, or any other data.

The method 400 can include step 426, initiating maintenance of the server device 306. In some implementations, step 426 is known as an upgrade process. In some implementations, step 426 can include having the server device 306 start upgrading itself once it has downloaded the build or updated software, if it is in the maintenance time (e.g. a present time is within a scheduled maintenance window for the server device). In some implementations, the maintenance time is known as the maintenance window.

The method 400 can include step 431, deregistering services provided by the server device. Deregistering services may comprise notifying a gateway, load balancer, application server, connector, client, or other such device that services are unavailable or that new connections may not be established to services provided by the server device. Deregistered services may not be available for selection by such devices. Upon reaching an identified best upgrade time, the server device 306 may initiate connection draining, perform upgrades, and re-register and cease connection draining.

The method 400 can include step 432, a decision block for determining if there are open client connections. If there are no open client connections, step 432 can proceed to step 438. If there are open client connections, step 432 can proceed to step 436. The decision can be made by the computing device 302 or processor 311.

The method 400 can include step 436, closing idle connections between the server device 306 and a client device 162. In step 436, if the server device is serving Independent Computing Architecture (ICA) traffic, the ICA connections may be disconnected from a first server device 306 and rerouted through another server device 306n in the same resource location. In an alternative implementation, the server device 306n is in a different resource location. In some implementations, such as for HTTP traffic, the presence of active traffic may cause a service disruption if the client device 162 is logged out and/or face disruption. To minimize disruptions, step 436 can include connection draining may prevent new connections from being established, while closing existing connections. In some implementations, the time during the connection draining can be referred to as the "idle window." In some such implementations, connection draining may be performed in a 2-step process. In the first step, once the server device 306 is ready to upgrade, it will acquire an upgrade lock. The lock prevents clients 162, management servers, other server devices, application servers, and user devices from establishing new connections via the server device. The server device 306 may notify a computing device 302 in the Data Point-of-Presence (POP) server to which it is registered if it was successful at acquiring the lock. Once successful at acquiring the lock, in a second step, the server device 306 may then deregister from the computing device 302 and disconnect its idle pool of data connections to the Data POPs. There will be no computing device 302 connections and the routing of traffic to the server device 306 can be ceased for any amount of time. Once the server device 306 has received confirmation of this event, it can widen its upgrade window and monitor its traffic. For small transactions, the server device 306 can send a "Connection: Close" request on these connections and "Reset" these connections. The "idle window" thus accomplishes connection draining by allowing connections to close while preventing new connections from being opened, resulting in the number of active connections through the server device 306 to "drain" or decrease over time.

The method 400 can include step 438, performing upgrade or maintenance procedure on the server device 162. Step 438 can include having the client device 162 be forced to manually reconnect to all the applications and/or server devices 306n. If there are still existing connections after the "idle window", such as idle connections or live traffic connections such as streaming, step 438 can include having the server device 306 forcefully start the upgrade by disconnecting or stalling connections. At any point in time in the "idle window," if all connected client devices 162 disconnect purposefully, experience idle timeouts, or disconnect for any other reason that results in the cessation of traffic through the server device 306, then the server device 306 can start the upgrade immediately. After the upgrade is complete, the server device 306 can release the upgrade lock, convey the success to the computing device, register back to the computing device 302, restore the previous connection states, and establish new connections. The server device 306 can shorten its upgrade window further after the upgrade, based on the increase in activity following an upgrade. After an upgrade of one server device 306, the other server devices 306n can perform the upgrade process as described therein. The server device 306 can be in the same resource location. For any idle connections, the end user refresh from the browser can be operational.

Various elements, which are described herein in the context of one or more implementations, may be provided separately or in any suitable subcombination. For example, the processes described herein may be implemented in hardware, software, or a combination thereof. Further, the processes described herein are not limited to the specific implementations described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method for automated maintenance of computing devices, comprising:
    receiving, by a management system from a server device providing services to a plurality of client devices, performance values for a plurality of time periods;
    calculating, by the management system, for each time period, a score as a weighted sum of the performance values corresponding to the time period, the plurality of calculated scores stored in an array;
    converting, by the management system, the array of the plurality of calculated scores from a time domain into a frequency domain;
    applying, by the management system, a noise reduction function to the converted array;
    converting, by the management system, the noise reduced converted array from the frequency domain into the time domain to generate an array of predicted scores;

selecting, by the management system based on the array, a maintenance time for the server device based on a time period corresponding to a lowest score of the array of predicted scores; and responsive to a present time corresponding with the maintenance time for the server device, initiating maintenance of the server device.

2. The method of claim 1, wherein the performance values comprise one or more of a processor utilization, a memory utilization, a network throughput, and a number of active connections.

3. The method of claim 1, wherein the noise reduction function comprises a low pass filter.

4. The method of claim 1, wherein the noise reduction function comprises removing frequencies having amplitudes below a threshold.

5. The method of claim 4, wherein the threshold is determined based on a highest amplitude frequency.

6. The method of claim 1, wherein initiating maintenance of the server device further comprises deregistering services provided by the server device.

7. The method of claim 6, wherein initiating maintenance of the server device further comprises directing the server device to close each connection of the server device with a client device, responsive to the connection becoming idle.

8. The method of claim 1, wherein initiating maintenance of the server device further comprises providing an identification of the maintenance time for the server device to the server device; and wherein the server device initiates maintenance, responsive to receipt of the identification of the maintenance time for the server device and responsive to the present time corresponding with the maintenance time for the server device.

9. The method of claim 1, wherein applying the noise reduction function to the converted array comprises removing high frequency signals from the converted data representing performance values varying between adjacent time periods of the plurality of time periods.

10. The method of claim 1, wherein applying the noise reduction function to the converted array removes signals representing irregular performance values during each time period.

11. The method of claim 1, wherein converting the noise reduced converted array from the frequency domain into the time domain further comprises applying a phase shift to one or more frequencies prior to the conversion.

12. A system for automated maintenance of computing devices, comprising:
a computing device comprising a network interface in communication with a server device providing services to a plurality of client devices, and a processor;
wherein the network interface is configured to receive, from the server device, performance values for a plurality of time periods;
wherein the processor is configured to:
calculate, for each time period, a score as a weighted sum of the performance values corresponding to the time period, the plurality of calculated scores stored in an array,
convert the array of the plurality of calculated scores from a time domain into a frequency domain,
apply a noise reduction function to the converted array,
convert the noise reduced converted array from the frequency domain into the time domain to generate an array of predicted scores,
select a maintenance time for the server device based on a time period corresponding to a lowest score of the array of predicted scores, and
responsive to a present time corresponding with the maintenance time for the server device, initiate maintenance of the server device.

13. The system of claim 12, wherein the performance values comprise one or more of a processor utilization, a memory utilization, a network throughput, and a number of active connections.

14. The system of claim 12, wherein the noise reduction function comprises a low pass filter.

15. The system of claim 12, wherein the noise reduction function comprises removing frequencies having amplitudes below a threshold.

16. The system of claim 15, wherein the threshold is determined based on a highest amplitude frequency.

17. The system of claim 12, wherein the processor is further configured to deregister services provided by the server device.

18. The system of claim 17, wherein the processor is further configured to direct the server device to close each connection of the server device with a client device, responsive to the connection becoming idle.

19. The system of claim 17, wherein the processor is further configured to perform an upgrade or maintenance procedure on the server device, responsive to all client connections of the server device being closed.

20. A non-transitory computer-readable medium comprising instructions that, when executed by a processor of a computing device, cause the computing device to:
receive, from a server device, performance values for a plurality of time periods;
calculate, for each time period, a score as a weighted sum of the performance values corresponding to the time period, the plurality of calculated scores stored in an array;
convert the array of the plurality of calculated scores from a time domain into a frequency domain,
apply a noise reduction function to the converted array,
convert the noise reduced converted array from the frequency domain into the time domain to generate an array of predicted scores,
select a maintenance time for the server device based on a time period corresponding to a lowest score of the array of predicted scores; and
responsive to a present time corresponding with the maintenance time for the server device, initiate maintenance of the server device.

* * * * *